· US010085323B2

(12) United States Patent
Schoen et al.

(10) Patent No.: US 10,085,323 B2
(45) Date of Patent: Sep. 25, 2018

(54) HELICOPTER SEARCH LIGHT AND METHOD OF ADJUSTING A LIGHT OUTPUT OF A HELICOPTER SEARCH LIGHT

(71) Applicant: Goodrich Lighting Systems GmbH, Lippstadt (DE)

(72) Inventors: Christian Schoen, Mainz (DE); Bjoern Schallenberg, Lippstadt (DE); Juergen Rodenkirchen, Lippstadt (DE); Marion Depta, Dortmund (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/680,303

(22) Filed: Aug. 18, 2017

(65) Prior Publication Data

US 2018/0054875 A1    Feb. 22, 2018

(30) Foreign Application Priority Data

Aug. 19, 2016 (EP) ..................... 16184926

(51) Int. Cl.
| | |
|---|---|
| B60Q 1/14 | (2006.01) |
| H05B 37/02 | (2006.01) |
| H05B 33/08 | (2006.01) |
| B64D 47/04 | (2006.01) |
| B60Q 1/24 | (2006.01) |

(52) U.S. Cl.
CPC ....... *H05B 37/0218* (2013.01); *B60Q 1/1423* (2013.01); *B60Q 1/245* (2013.01); *B64D 47/04* (2013.01); *H05B 33/0854* (2013.01); *B64D 2203/00* (2013.01)

(58) Field of Classification Search
CPC ............ H05B 33/0845; H05B 33/0854; H05B 37/0227; B60Q 1/1423; B64D 47/04; B64D 47/06
USPC ...................................... 315/76, 77
See application file for complete search history.

(56) References Cited

U.S. PATENT DOCUMENTS

| | | | |
|---|---|---|---|
| 7,438,451 | B2 | 10/2008 | Daniel |
| 8,475,002 | B2 | 7/2013 | Maxik et al. |
| 9,176,314 | B1 | 11/2015 | Hartwell |
| 9,220,153 | B2 | 12/2015 | Pan et al. |

(Continued)

FOREIGN PATENT DOCUMENTS

| | | |
|---|---|---|
| EP | 2537709 A2 | 12/2012 |
| EP | 3012151 A1 | 4/2016 |

(Continued)

OTHER PUBLICATIONS

Extended European Search Report for International Application No. 16184926.0 dated Aug. 19, 2016, 5 pages.

*Primary Examiner* — Tung X Le
(74) *Attorney, Agent, or Firm* — Cantor Colburn LLP

(57) ABSTRACT

A helicopter search light comprises a lighting arrangement comprising at least one light source and having an adjustable light output; a light detector, which is configured for detecting light reflected by the ground and/or at least one item on the ground and for providing a detection signal which is correlated to an amount of light detected; and a control unit, coupled to the light detector for receiving the detection signal and to the at least on light source for controlling the adjustable light output of the lighting arrangement.

17 Claims, 5 Drawing Sheets

(56) References Cited

U.S. PATENT DOCUMENTS

| | | | |
|---|---|---|---|
| 2008/0137353 A1* | 6/2008 | Larsen | B64D 47/04 |
| | | | 362/470 |
| 2013/0321192 A1* | 12/2013 | Starr | G01S 7/04 |
| | | | 342/29 |
| 2014/0320026 A1 | 10/2014 | Zhao et al. | |
| 2015/0035440 A1 | 2/2015 | Spero | |
| 2015/0130644 A1* | 5/2015 | Kiel | B64D 47/04 |
| | | | 340/953 |
| 2016/0345401 A1* | 11/2016 | Hessling-Von Heimendahl | |
| | | | B60Q 1/1423 |

FOREIGN PATENT DOCUMENTS

| WO | 2015074893 A1 | 5/2015 |
|---|---|---|
| WO | 2015145159 A1 | 10/2015 |

* cited by examiner

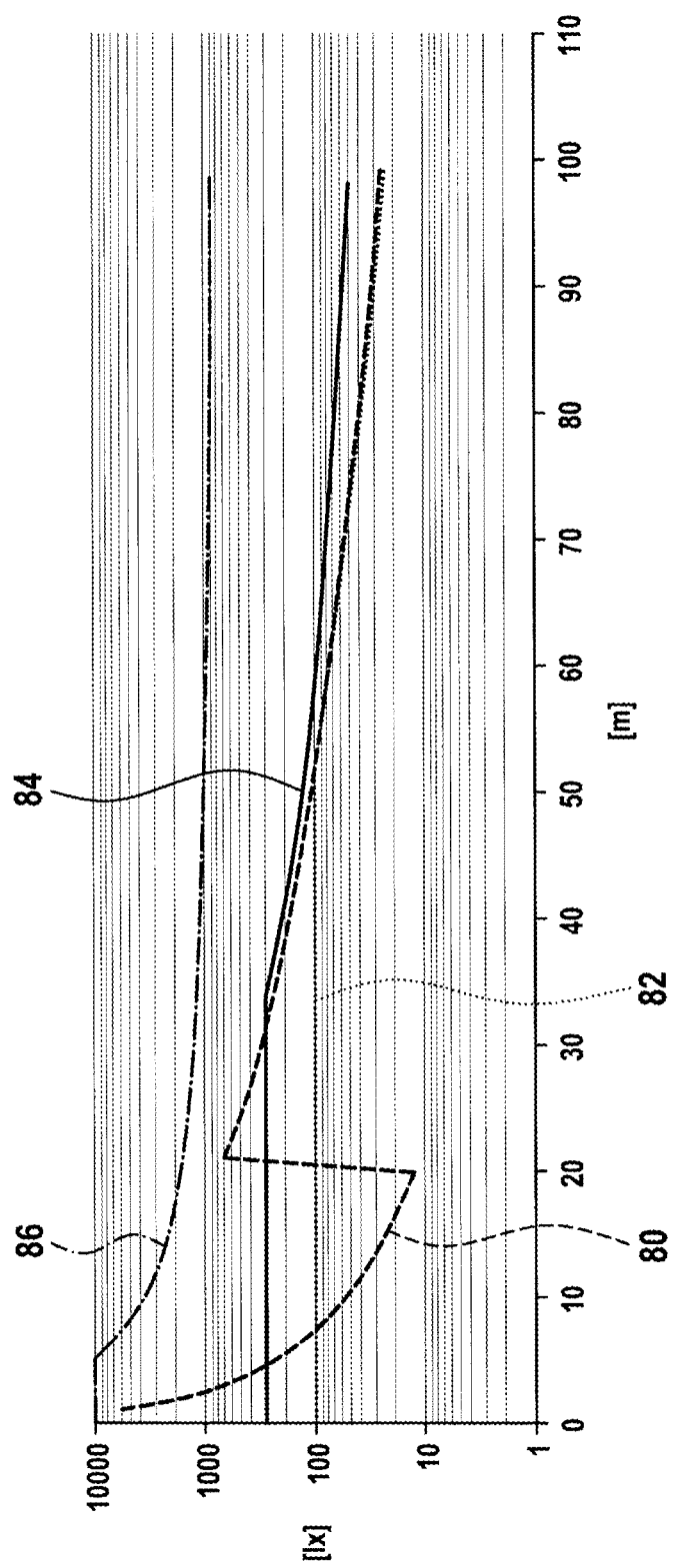

HELICOPTER SEARCH LIGHT AND METHOD OF ADJUSTING A LIGHT OUTPUT OF A HELICOPTER SEARCH LIGHT

FOREIGN PRIORITY

This application claims priority to European Patent Application No. 16184926.0 filed Aug. 19, 2016, the entire contents of which is incorporated herein by reference.

BACKGROUND

The present invention is in the field of exterior helicopter lighting and, in particular to helicopter search lights.

Helicopters are often equipped with so-called helicopter search lights. Such helicopter search lights are used for illuminating the environment of a helicopter, in particular for illuminating the ground in an area in front of and below the helicopter. Helicopter search lights are particularly used for inspecting the ground for potential obstacles, such as power lines, trees, etc., in particular during a landing approach.

The result of operating currently available helicopter search lights is not satisfactory under all environmental conditions. For example, a large contrast, i.e. a large difference between the luminance of an area, which is illuminated by the search light, and its surrounding, which is not illuminated by the search light, may deteriorate the pilot's visual perception.

Accordingly, it would be beneficial to provide a helicopter search light that is capable of providing improved illumination under a wide range of environmental conditions.

SUMMARY

Exemplary embodiments of the invention include a helicopter search light comprising: a lighting arrangement with at least one light source and having an adjustable light output; a light detector, which is configured for detecting light reflected by the ground and/or at least one item on the ground and for providing a detection signal which is correlated to an amount of light detected; and a control unit, coupled to the light detector for receiving the detection signal and to the at least one light source for controlling the adjustable light output of the lighting arrangement. The control unit is configured for selectively switching at least a subset of the at least one light source on and off; for determining a first light detection value from the detection signal, the first light detection value being indicative of the amount of light detected while the at least one subset of the at least one light source is switched off; and for determining a second light detection value from the detection signal, the second light detection value being indicative of the amount of light detected while the at least one subset of the at least one light source is switched on. The control unit is further configured for controlling the adjustable light output of the lighting arrangement as a function of the first light detection value and of the second light detection value.

Exemplary embodiments of the invention also include a method of adjusting a light output of a helicopter search light, with the helicopter search light having a lighting arrangement comprising at least one light source and having an adjustable light output, wherein the method includes the steps of:

(a) switching at least a subset of the at least one light source off;

(b) detecting ambient light reflected by the ground and/or at least one item on the ground and providing a first light detection value, the first light detection value being indicative of the amount of light detected;

(c) switching the at least one light source on;

(d) detecting light reflected by the ground and/or at least one item on the ground and providing a second light detection value, the second light detection value being indicative of the amount of light detected; and (e) controlling the adjustable light output of the lighting arrangement as a function of the first and second light detection values.

Exemplary embodiments of the invention allow to enhance the pilot's visual perception of the environment by controlling the adjustable light output of the lighting arrangement as a function of the illumination provided by ambient light, such as moon light, or other light sources, which are independent from the helicopter.

The pilot's visual perception may be enhanced by controlling the helicopter search light such that it emits as little light as necessary for allowing the pilot to clearly see the illuminated objects without creating an over exposure which would limit the pilot's peripheral vision of the non-illuminated areas.

According to a further embodiment, the function of the first light detection value and of the second light detection value is a ratio between the second light detection value and the first light detection value and the control unit is configured for controlling the adjustable light output of the lighting arrangement so that the ratio between the second light detection value and the first light detection value approaches a predetermined ratio target value.

In this context, "approaches" means that the adjustable light output of the lighting arrangement is controlled so that the ratio becomes as close to the predetermined ratio target value as technically possible under the actual conditions including the actual ambient/external light, the reflectivity conditions of the ground and the limits of the illumination capacity of the helicopter search light.

According to another embodiment, the adjustable light output of the lighting arrangement may be controlled so that the ratio between the second light detection value and the first light detection value is within a predetermined range, which is defined by a lower ratio limit and an upper ratio limit.

According to a further embodiment, the target ratio value is between 1:5 and 1:50, in particular between 1:5 and 1:15, more in particular about 1:10. Such target values have been found as beneficial for achieving a good visual perception by the pilot. Such target ratio values result in a well illuminated spot, but they also limit the overall light pollution that would harm perception on peripheral vision of areas outside the illuminated spot and in situations in which the search light is switched off.

According to a further embodiment, the control unit is configured for controlling the adjustable light output of the lighting arrangement so that the second light detection value exceeds a predetermined minimum illumination value. The first and second light detection values in particular may be illuminance values and the predetermined minimum illumination value may be in a range between 50 lx and 500 lx, in particular between 50 lx and 150 lx, more in particular about 100 lx. Such minimum illuminance values have been found as beneficial for achieving a sufficient minimum illumination.

By controlling the adjustable light output of the lighting arrangement based on a combination of a predetermined target ratio value with a predetermined minimum illumination value of the second light detection value, a helicopter search light according to exemplary embodiments of the invention can detect and adjust absolute and relative brightness levels and account for that in order to shed as little light as possible but still provide a distinct search light illumination enhancing the pilot's perception.

According to a further embodiment, exceeding or at least reaching the predetermined minimum illumination value of the second light detection value takes precedence over the requirement that the ratio between the second light detection value and the first light detection value approaches a predetermined ratio target value. I.e. in a very dark environment (new moon and/or under a dense blanket of clouds), although the spot light is generally not supposed to exceed a predetermined target ratio value of e.g. 10× with respect to the ambient light, said predetermined target ratio value is exceeded to ensure a minimum useful illumination, i.e. to exceed the predetermined minimum illumination value, which in this case will be the limiting factor. Under fairly bright conditions (full moon and/or presence of external lights), the light is turned on much brighter in order to keep the ratio as close as possible to the predetermined target ratio value. In such a situation, not the minimum illumination value, but the predetermined target ratio value is the limiting factor.

According to a further embodiment, the control unit is configured for adjusting the adjustable light output of the lighting arrangement by means of a feedback control loop using the signal provided by the light detector as an input value for adjusting the adjustable light output of the lighting arrangement.

According to a further embodiment, the control unit is configured for repeatedly adjusting the adjustable light output of the lighting arrangement on the basis of repeatedly, in particular periodically, switching the at least one subset of the at least one light source on and off and repeatedly determining the first and second light detection values. Switching the light source off, allows to determine the luminance of the non-illuminated ground while the light source is switched off.

By alternately switching the at least one subset of the at least one light source on and off, the luminance of the non-illuminated ground may be determined continuously and the operation of the helicopter search light may be continuously adjusted to changing environmental conditions, in particular a changing luminance of the ground. The luminance of the ground may change due to changing ambient light conditions and/or due to changing reflection characteristics of the ground, e.g. when the helicopter is flying from a wooded area to a snow covered area, over an illuminated city or over a surface of water.

In a further embodiment, controlling the adjustable light output of the lighting arrangement may be based on an average of or on an integral over a plurality of successive time periods, e.g. a plurality of successive first light detection values, which are indicative of the amount of light detected while the at least one subset of the at least one light source is switched off. Using an average of or an integral over a plurality of successive time periods enhances the quality of the control. In particular, oscillations of the illumination, which may result from short and/or accidental artifacts of the ground or ambient/external light, may be avoided. Analogously, an average of or an integral over a plurality of successive second light detection values may be used.

According to a further embodiment, controlling the adjustable light output of the lighting arrangement includes switching the at least one subset of the at least one light source periodically on and off employing a pulse width modulation, and by adjusting a duty factor of said pulse width modulation. Pulse width modulation is a convenient measure for adjusting the amount of light emitted by the helicopter search light, in particular when the at least one light source of the helicopter search light includes LEDs. In other words, controlling the adjustable light output in accordance with a pulse width modulation is a convenient way of dimming the at least one subset of the at least one light source. Switching the at least one subset of the at least one light source periodically on and off allows to easily determine (measure) the luminance of the non-illuminated ground during the time periods in which the at least one light source is switched off.

According to a further embodiment, the lighting arrangement comprises a flood light mode and a spot light mode, and the lighting arrangement is switchable between the flood light mode and the spot light mode. The control unit in particular may be configured for switching the lighting arrangement between the flood light mode and the spot light mode depending on the first light detection value and the second light detection value. The spot light modes provides a relatively small, highly illuminated area, whereas the flood light mode provides a relatively wide, weakly illuminated area, wherein the brightness of the illumination in the flood light mode is lower than that in the spot light mode. Switching between the flood light mode and the spot light mode is one option for adjusting the illumination provided by the helicopter search light to current needs.

According to a further embodiment, the lighting arrangement comprises a first subset of the at least one light source which is operated in the flood light mode, and a second subset of the at least one light source which is operated in the spot light mode. Providing two different subsets of light sources for the flood light mode and for the spot light mode, respectively, allows for optimizing the patterns of light emitted in said two modes. It further allows operating the helicopter search light in both modes with high efficiency. Both the first subset and the second subset of the light sources may be dimmable via pulse width modulation for a finer adjustment of the light output.

According to a further embodiment, the light detector is a luminance detector. A luminance detector allows for a very accurate measurement of the amount of light reflected by the ground and/or at least one item on the ground. A luminance measurement is a suitable indication of the brightness perceived by the human eye. It therefore allows for an adjustment of the light output of the helicopter search light that is particularly pleasing to the human eye.

According to a further embodiment, the light detector is configured for virtual spot measurement, i.e. the area detected by the light detector is small compared to the illuminated area and therefore may be interpreted as indicating the luminance of the illuminated areas. The detection angle of the light detector in particular may be significantly smaller, e.g. at least ten times smaller, than the light emission angle of the lighting arrangement. In an embodiment, the detection angle of the light detector is smaller than or equal to 5°, in particular smaller than or equal to 3°. In case the detection angle of the light detector would be in the same range as the opening angle of the light distribution, the light detector would be able to measure only reflectance, but it could not account for the square root distance/luminance correlation. Considerably restricting the detection angle of the light detector, however, allows to use a photo detector instead of a comparatively expensive luminance detector as the light detector.

According to a further embodiment, the light detector may comprise a collimating lens and/or a parabolic reflector. The collimating lens and/or the parabolic reflector are configured for restricting the detection angle of the light detector. A collimating lens and/or a parabolic reflector allow to efficiently restrict the detection angle of the light detector with a high signal-to-noise (S/N) ratio.

According to a further embodiment, the light detector may be a CCD-sensor providing a spatially resolved record of the ambient brightness.

BRIEF DESCRIPTION OF THE DRAWINGS

Further exemplary embodiments are described with respect to the accompanying drawings, wherein:

FIG. 8 shows various graphs illustrating the effect of exemplary embodiments of the invention on the illuminance on the ground.

DETAILED DESCRIPTION

Figure 1:
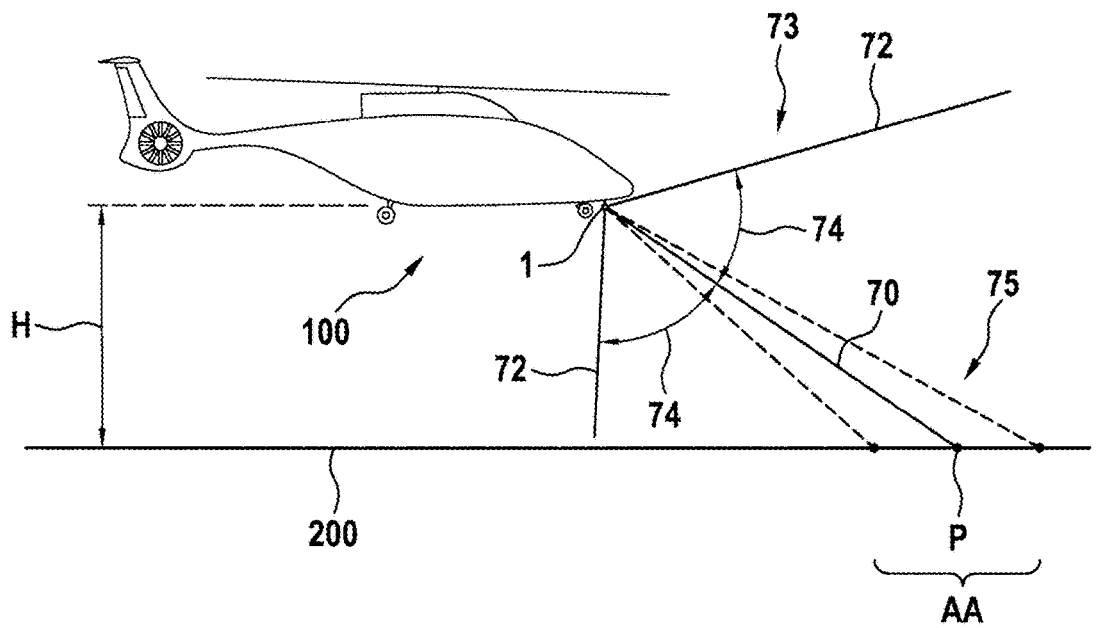
FIG. 1 shows a helicopter comprising a helicopter search light in accordance with an exemplary embodiment of the invention.

FIG. 1 shows a helicopter 100 flying at a height H above a ground 200. The helicopter 100 is equipped with a helicopter search light 1 mounted to a front bottom portion of the helicopter 100. The helicopter search light 1 comprises a lighting arrangement 2 having an adjustable light output, with the lighting arrangement 2 being described in detail with respect to FIGS. 2 and 3. Line 70 in FIG. 1 indicates the main direction of the light emitted by the helicopter search light 1.

The lighting arrangement 2 of the helicopter search light 1 may have at least two modes of operation: a flood light mode and a spot light mode. The spot light mode is sometimes called "search mode" or "pencil mode".

When the helicopter search light 1 is operated in the spot light mode, a narrow beam of light 75, as it is schematically defined by the dashed lines, is emitted from the helicopter search light 1, substantially in the direction of line 70. The pilot may thus inspect the ground 200 in an area AA around a position P where the line 70 representing the main light emission direction meets the ground 200. In the spot light mode, the light emitted by the helicopter search light 1 is bundled along the main light emission direction. As a result, the ground 200 is brightly illuminated in a relatively small area AA, which is located around the position P, allowing for a close and thorough inspection by the pilot.

In the flood light mode, the lighting power of the lighting arrangement 2 is distributed between the lines 72 defining a much broader cone 73 around the main light emission direction 70. The cone 73 may have an opening angle of some 100°, which is indicated by the two angles 74 shown in FIG. 1. Using the flood light mode, the pilot may inspect a larger portion of the environment than in the spot light mode. Since in the flood light mode the lighting power of the helicopter search light 1 is distributed over a larger angular region and thus over a larger area than in the spot light mode, the illuminance of the ground 200 is considerably less than in the spot light mode. In consequence, the flood light mode is usually used only when the helicopter 100 is flying at low heights H, e.g. heights H of up to 20 m or 30 m, relatively close to the ground 200. In this situation, due to the reduced distance form the ground 200, the amount of light reaching the ground in the flood light mode is sufficient for ground inspection.

Figure 2:
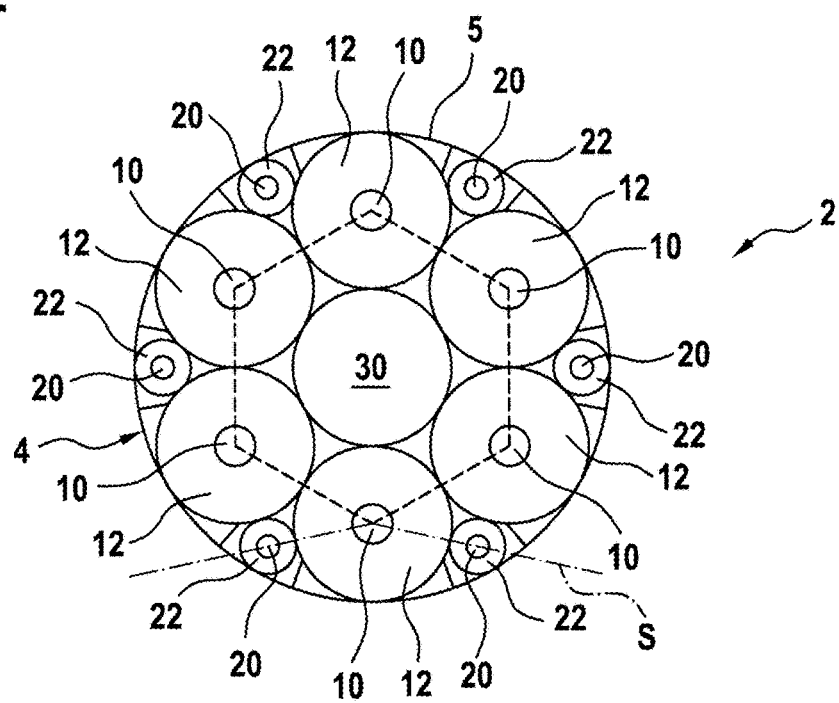
FIG. 2 shows a top view of a helicopter search light in accordance with an exemplary embodiment of the invention.

FIG. 2 shows a top view of a lighting arrangement 2 of a helicopter search light 1 in accordance with an exemplary embodiment of the invention.

The lighting arrangement 2 comprises a light head 4 having a cylindrical side wall 5, whose upper edge is shown as a circle in the top view of FIG. 2. The lighting arrangement 2 further comprises six first light sources 10 (first subset of light sources) and six second light sources 20 (second subset of light sources), respectively arranged within the light head 4.

Each of the first and second light sources 10, 20 is associated with a corresponding optical system 12, 22. Each of the first light sources 10 has a respective first optical system 12 associated therewith, and each of the second light sources 20 has a respective second optical system 22 associated therewith.

In the exemplary embodiment of FIG. 2, the first optical systems 12 are of identical design. The respective combinations of the light sources 10, 20 and the optical systems 12, 22 are also cylindrical in shape.

The combinations of the first light sources 10 and the corresponding optical systems 12 have a size that allows to arrange six of these combinations within the light head 4 at the corners of an equilateral (virtual) hexagon, which is indicated by a dotted line in FIG. 2.

The six second light sources 20 are arranged in spaces provided between said six combinations, respectively consisting of said first light sources 10 and the associated optical systems 12, and the light head 4. Each of the second light sources 20 is associated with a respective second optical system 22. These combinations consisting of a second light source 20 and an associated second optical system 22 are packed between two of the first light sources 10 and the cylindrical side wall 5 of the light head 4, respectively.

The first light sources 10 are operated for providing the spot light mode of the lighting arrangement 2. The second light sources 20 are operated for providing the flood light mode of the lighting arrangement 2.

The helicopter search light 1 further comprises a light detector 30, which may be arranged in the center of the hexagon formed by the first light sources 10.

Alternatively, the light detector 30 may by mounted at another position of the lighting arrangement 2 and/or of the helicopter 100. The light detector 30 e.g. may by located within the housing 4 at the position of any of the first and second light sources 10, 20. In this case, a first or second light source 10, 20 may be arranged at the center of the lighting arrangement 2, i.e. at the position of the light detector 30 shown in FIG. 2. In a further configuration, which is not shown in the figures, the light detector 30 may be arranged at the fuselage of the helicopter 100 outside the housing 4 of the lighting arrangement 2.

Figure 3:
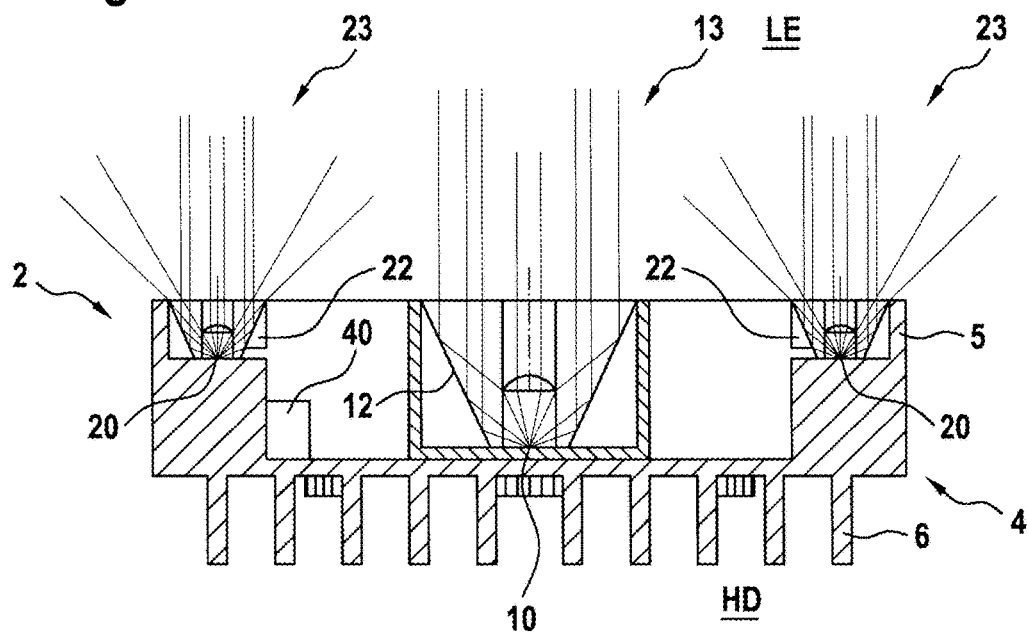
FIG. 3 shows a cross-sectional view through the helicopter search light shown in FIG. 2.

A cross-sectional view of the helicopter search light 1 shown in FIG. 2 is shown in FIG. 3. The cross-sectional plane of FIG. 3 is oriented along line S drawn in FIG. 2. The cross-sectional view of FIG. 3 illustrates the straight extension (in the top/bottom dimension) of the cylindrical wall 5 of the housing 4. The helicopter search light 1 has a light emission side LE, depicted as the top side in the viewing plane of FIG. 3, and a heat discharge side HD, which is depicted as the bottom side in the viewing plane of FIG. 3. For said heat discharge, the housing 4 is equipped with a cooling rib structure 6 providing a heat sink for the light sources 10, 20 arranged within the housing 4.

A first light source 10 is illustrated in the cross-sectional view shown in FIG. 3. A first optical system 12 is arranged above and around the first light source 10. The first optical system 12 comprises a collimating lens and/or a collimating reflector. As illustrated by the exemplary light rays 13 of FIG. 3, the collimating lens and the collimating reflector alter the direction of the light rays 13, emitted by the first light source 10, in such a way that they all leave the helicopter search light 1 in substantially the same direction, namely towards the top in the viewing plane of FIG. 3. This substantially collimated light is emitted by the helicopter search light 1 in the spot light mode.

Two second light sources 20 that are arranged adjacent the cylindrical side wall 5 of the housing 4 are visible in the cross-sectional view of FIG. 3. In other words, one second light source 20 is arranged adjacent the side wall 5 of the housing 4 on the right side of the helicopter search light 1 in the viewing plane of FIG. 3, while the other second light source 20 is arranged adjacent the side wall 5 of the housing 4 on the left side of the helicopter search light 1 in the viewing plane of FIG. 3.

Each of the two second light sources 20 comprises a second optical system 22 associated therewith. The second optical systems 22 are arranged above and around the second light sources 20 in the viewing plane of FIG. 3. In the exemplary embodiment of FIGS. 2 and 3, each second optical system 22 comprises a reflector and a lens. The reflector reflects a portion of the light emitted by the respective second light source 20 towards the main light emission direction, i.e. towards the direction normal to the housing 4, i.e. normal to the whole helicopter search light 1. Also, the lens refracts a portion of the light emitted by the respective second light source 20 towards the main light emission direction. A substantial portion of the light of the second light sources 20 leaves the helicopter search light 1 in an unaltered manner, providing a wide opening angle of the light output. Overall, the second optical system 22 is designed in such a way that a controlled stray light distribution leaves the helicopter search light 1. This is illustrated by the exemplary light rays 23 of FIG. 3. It is also possible that each of the second optical systems 22 comprises a respective lens that provides for the controlled stray light distribution. The light from the second light sources 20 is emitted by the helicopter search light 1 in the flood light mode.

The first and second light sources 10, 20 may comprise LEDs, in particular LEDs emitting light in the visible light range, i.e. light that is visible to the human eye. Alternatively or additionally, at least one of the first and second light sources 10, 20 may be configured for emitting infrared and/or ultraviolet light, which is visible to the human eye with the help of an appropriate device such as a night vision device.

Figure 4:
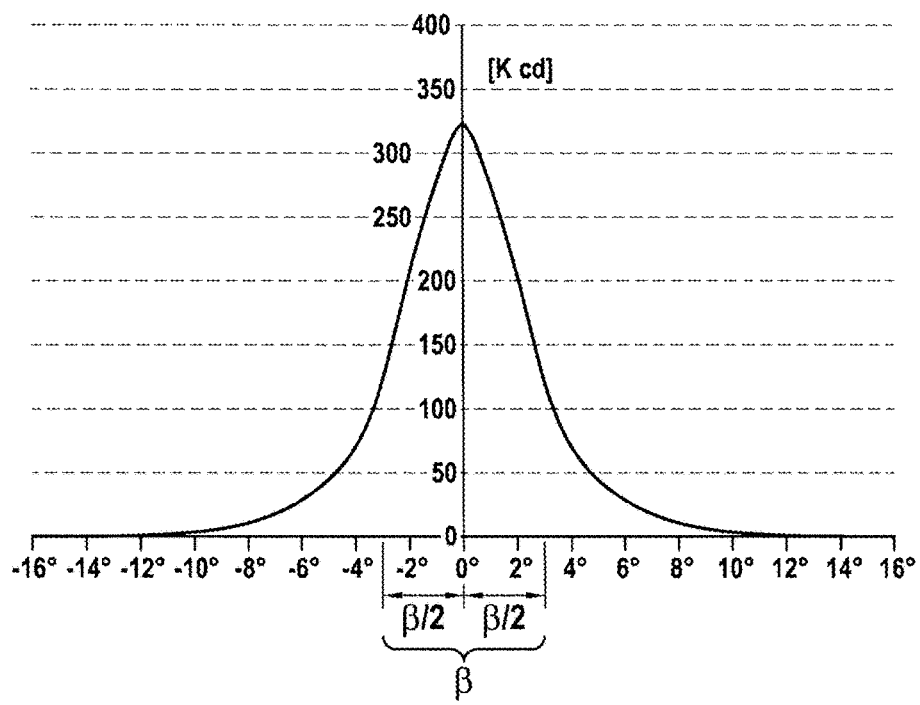
FIG. 4 illustrates an exemplary angular intensity distribution of the light emitted by a helicopter search light according to an exemplary embodiment of the invention.

FIG. 4 illustrates an exemplary angular intensity distribution of the light emitted by a lighting arrangement 2 of a helicopter search light 1 according to an exemplary embodiment of the invention operated in the spot light mode.

The light cone emitted by the lighting arrangement 2 has a half beam angle (β/2) of approximately 3° and a peak intensity at the center of the beam (at an angle of 0°) of 310,000 to 320,000 cd. Thus, FIG. 4 shows that the light emitted by the lighting arrangement 2 is concentrated in a narrow beam having an opening angle β of approximately 6°.

Figure 5:
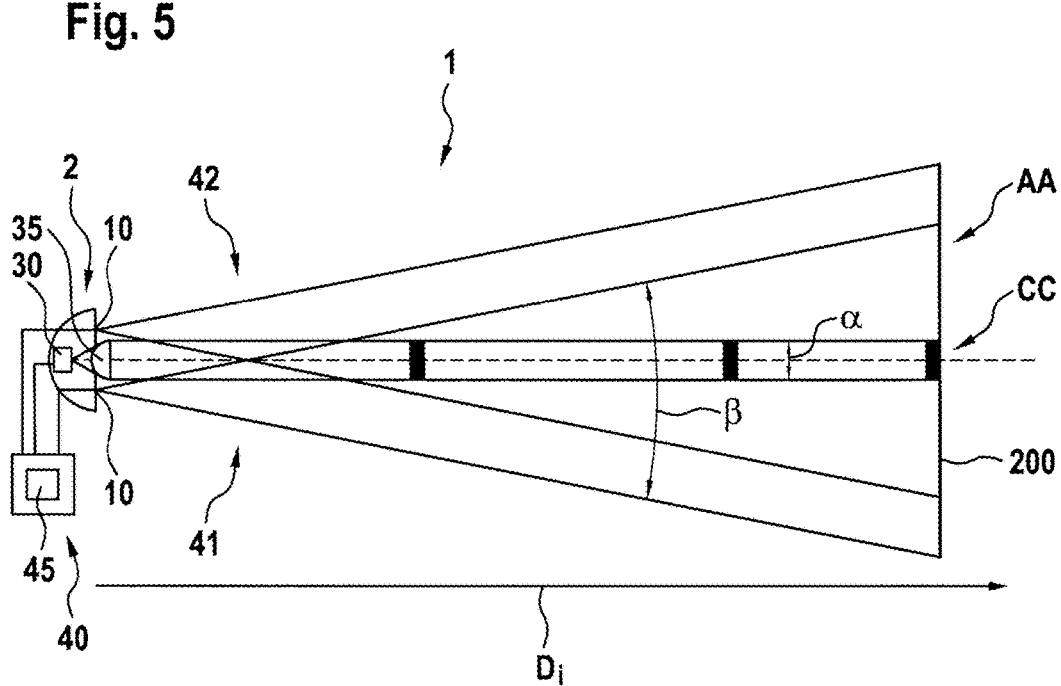
FIG. 5 is a schematic drawing of a helicopter search light according to an exemplary embodiment of the invention.

FIG. 5 is a schematic drawing depicting a helicopter search light 1 according to an exemplary embodiment of the invention.

FIG. 5 in particular shows two exemplary light cones 41, 42. Each of the light cones 41, 42 is emitted by a first light source 10, respectively. The skilled person will understand that a similar picture may be drawn for light cones emitted by the second light sources 20 as well. The skilled person will further understand that the light cones virtually entirely overlap in the far field, i.e. that the two light cones illuminate virtually the same ground area, as the distance between the helicopter search light 1 and the ground is generally much bigger than the distance between the two first light sources 10. Due to the limited extension that can be depicted in FIG. 5, this far-field effect is not shown in FIG. 5, but will be readily appreciated by the skilled person. For this reason, the opening angle β of the light beam emitted by the helicopter search light 1 is indicated as the opening angle of the light cone 41 only.

FIG. 5 shows that the area AA of the ground 200, which is covered by the light cones 41, 42, increases with increasing distance Di from the light source 10. In fact, the amount of area AA increases quadratically with the distance Di. In consequence, the brightness of the illuminated area AA quadratically decreases with increasing distance Di from the light source 10.

According to an exemplary embodiment of the present invention, the luminance of a constant or at least substantially constant central portion CC of the illuminated area AA is measured. The brightness of a constant central portion (detection area) CC of the illuminated area AA in particular is measured by means of the light detector 30.

One possible option for the light detector 30 is a combination of a commercially available luminance detector comprising a photo detector, which may include a CCD, and a distance meter. Such a luminance detector allows to calculate the luminance of the ground 200 from the amount of reflected light detected by the photo detector in combination with the distance Di between the helicopter 100 and the illuminated surface area AA, which is measured by the distance meter.

As a less complex, more easily implementable and less expensive alternative to a luminance detector, a light detector 30 whose angle of detection α is restricted to a relatively narrow angle may be used. Due to the relatively small angle of detection α, the size of the detection area CC will remain basically constant even if the distance Di between the light detector 30 and the ground 200 changes.

The angle of detection α in particular may be at least an order of magnitude (ten times) smaller than the opening angle β of the light cones 41, 42.

As in this case the size of the detection area CC, which is covered by the light detector 30, is basically independent of the distance Di between the light detector 30 and the ground 200, such a light detector 30 is basically performing a virtual spot measurement. The result of such a measurement may be interpreted as an indication of the luminance. This approximation of the luminance is suitable for the desired purpose of controlling the first and/or second light sources 10, 20 according to exemplary embodiments of the invention.

In contrast, in case the angle of detection α of the light detector 30 would be in the same range as the opening angle β of the light distribution of the light cones 41, 42, the light detector 30 would measure only the reflectance, but could not adjust to the distance/luminance correlation. Thus, the angle of detection α of the light detector 30 is chosen to be significant smaller than the opening angle β of the light sources 10, 20 according to exemplary embodiments.

An optical system 35 comprising a pin hole aperture or an optical system 35 having a better signal-to-noise (S/N) ratio than a pin hole aperture, such as a collimating lens and/or a parabolic reflector, may be used for reducing the detection angle of the light detector 30 appropriately, in particular to a detection angle of less than or equal to 3°.

The helicopter search light 1 further comprises a control unit 40. The control unit 40 may be provided within or next to the light head 4. Alternatively, the control unit 40 may be arranged in another part of the helicopter 100, e.g. in the cockpit of the helicopter 100.

The detection signal provided by the light detector 30 is delivered to the control unit 40, which in particular may include a feedback control loop. In order to achieve the desired illuminance of the ground 200, the control unit 40 is configured for switching between the spot light mode and the flood light mode and/or for dimming the light emitted by the light sources 10, 20 employing pulse width modulation, as described before, based on the detection signal provided by the light detector 30.

The control unit 40 in particular includes a switching circuit 45. The switching circuit 45 is electrically coupled to an electrical power source (not shown), as well as to the first and second light sources 10, 20. The switching circuit 45 allows for selectively switching the first and second light sources 10, 20 on and off. The switching circuit 45 in particular allows for selectively switching between the spot light mode, in which the first light sources 10 are switched on and the second light sources 20 are switched off, and the flood light mode, in which the second light sources 20 are switched on and the first light sources 10 are switched off. The switching circuit 45 further may allow operating the helicopter search light 1 in a combined mode, in which both, the first and second light sources 10, 20, are simultaneously switched on.

Additionally, the control unit 40 is configured for dimming the first light sources 10 and/or the second light sources 20, in particular by employing a pulse width modulation (PWM). Dimming by means of pulse width modulation includes periodically switching the first light sources 10 and/or the second light sources 20 on and off and varying a duty cycle, i.e. the ratio of the lengths of the periods of time in which the lights sources 10, 20 are switched on with respect to the combined lengths of the periods of time in which the lights sources 10, 20 are switched on and off, for adjusting the amount of light output by the first light sources 10 and/or the second light sources 20.

Figure 6:
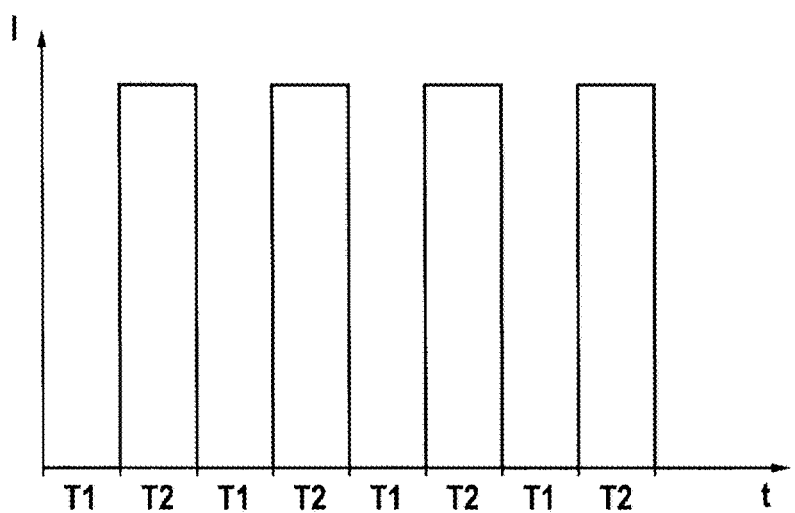
FIG. 6 illustrates the signal of a pulse width modulation.

FIG. 6 illustrates an exemplary embodiment of such a pulse width modulation (PWM). In FIG. 6 the amount of light I emitted by the lighting arrangement 2 is depicted on the vertical y-axis over time t (x-axis).

The first light sources 10 and/or the second light sources 20 of the lighting arrangement 2 are periodically switched off for a first period of time $T_1$, and they a switched on for a successive second period of time $T_2$. The first light sources 10 and/or the second light sources 20 in particular may be switched on and off with a frequency between 50 Hz and 200 Hz, in particular with a frequency of 100 Hz to 150 Hz.

In the example shown in FIG. 6, the length of the first period of time $T_1$ is equal to the length of the second period of time $T_2$. This corresponds to a duty cycle of 50%. This, however, is only exemplary. The lighting arrangement 2 in particular may be dimmed by varying the duty cycle R, i.e. the ratio between the second period of time $T_2$ (on time) and the combination of the first period of time $T_1$ (off time) and the second period of time $T_2$ (on time) ($R=T_2/(T_1+T_2)$). In particular, the duty cycle R is increased by extending the second period of time $T_2$ and/or by shortening the first period of time $T_1$ for increasing the amount of light I emitted by the lighting arrangement 2. For reducing the amount of light emitted by the lighting arrangement 2, the duty cycle R is decreased by shortening the second period of time $T_2$ and/or by extending the first period of time $T_1$.

Figure 7:
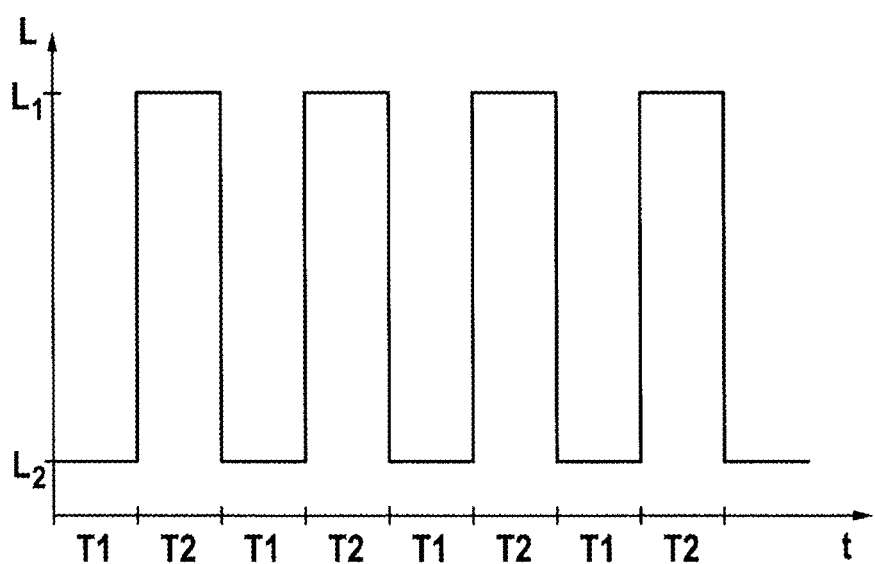
FIG. 7 illustrates the luminance of the ground as it results from controlling the lighting arrangement of the helicopter search light employing the pulse width modulation shown in FIG. 6.

FIG. 7 illustrates the luminance L of the ground 200, which results from controlling the lighting arrangement 2 of the helicopter search light 1 employing the example of pulse width modulation shown in FIG. 6.

During the first (off) time periods $T_1$, in which all light sources 10, 20 of the lighting arrangement 2 are switched off, the luminance L of the ground 200 is equal to a first value (ambient illumination luminance value) $L_1$, which results from ambient light (e.g. moon light) which is reflected from the ground 200.

During the second (on) time periods $T_2$, in which at least a subset of the light sources 10, 20 of the lighting arrangement 2 is switched on, the luminance L of the ground 20 is equal to a second value (head light illuminated luminance value) $L_2 > L_1$. The increased luminance $L_2$ results from the combination of ambient light (ambient illumination luminance value $L_1$) and the additional amount of light provided by the activated subset of the light sources 10, 20 of the lighting arrangement 2.

Integration of $L_1$ over $T_1$ results in a first light detection value $w_1$ (in the case shown in FIG. 7: $w_1 = L_1 * T_1$) and integration of $L_2$ over $T_2$ results in a second light detection value $w_2$ (in the case shown in FIG. 7: $w_2 = L_2 * T_2$). It is also possible to carry out the integration over multiple on/off times. By adjusting the length of the time periods $T_1$ and/or $T_2$, the ratio $r = w_2/w_1$ between the second and first light detection values $w_2$, $w_1$ may be selectively adjusted, it in particular may be adjusted to approach a desired target ratio $r_T$.

FIG. 8 shows various graphs illustrating the effect of exemplary embodiments of the invention on the illuminance on the ground 200. The graphs depicted in FIG. 8 in particular indicate the time-averaged illuminance (=luminous intensity/distance$^2$) I on the ground 200 (y-axis) as a function of the height/distance from the ground H (x-axis).

The dashed curve 80 indicates an illuminance I as it is generated by a helicopter search light 1 according to the prior art, i.e. by a helicopter search light 1 which is not continuously dimmed, but only switched between a flood light and a spot light mode.

At low heights H (H<20 m), the helicopter search light 1 is operated in the flood light mode. With increasing height H, the illuminance I on the ground 200 decreases as a quadratic function of the height H. At a height H of approximately 20 m, the illuminance I on the ground 200 comes close to the illuminance I generated by ambient light of approximately 10 lx. When the height H above the ground 200 increases further, the helicopter search light 1 is switched from the flood light mode to the spot light mode. Switching the helicopter search light 1 from the flood light mode to the spot light mode results in an increase of the illuminance I on the ground 200 from approximately 10 lx to approximately 600 lx. In the spot light mode the increased illuminance I is concentrated in an area AA which is considerably smaller than in the flood light mode. With further increasing height above the ground the illuminance I on the ground 200 decreases again.

As a result, in the conventional operational mode, as it is indicated by the dashed curve 80, there is a large contrast ratio r between the illuminance of the illuminated area, which may be larger than 1000 lx, and the illuminance of the area which is not illuminated (10 lx). Such a large contrast ratio r is very likely to deteriorate the pilot's visual perception, in particular the visual perception of peripheral areas outside the illuminated area.

The dotted curve 82 illustrates a similar ambient situation, i.e. a situation with an ambient illuminance on the ground 200 of 10 lx. In the situation represented by the dotted curve 82, however, the helicopter search light 1 is dimmed, i.e. the amount of light emitted by the helicopter search light 1 is controlled according to an exemplary embodiment of the invention. In particular, the illuminance of the illuminated area of the ground 200 is restricted to 100 lx, i.e. tenfold the ambient illuminance of 10 lx (desired target ratio $r_T$ is 10). This results in a constant illuminance of the ground, as indicated by a horizontal curve, for heights H up to approximately 50 m.

At heights H above 50 m the capacity of the helicopter search light 1, even when operated at full strength, is not sufficient for generating an illuminance on the ground 200 of 100 lx or more. Thus, the illuminance on the ground 200 decreases for heights H above 50 m.

The constant illuminance on the ground 200 is achieved in the following manner. Below a height of about 10 m, where the maximum illuminance generated by the flood light mode has fallen to 100 lx, the helicopter search light is operated in the flood light mode, with appropriate dimming via pulse width modulation reducing the illuminance on the ground 200 to 100 lx. Above the height of about 10 m and below a height of about 50 m, the helicopter search light is operated in the spot light mode, with appropriate dimming via pulse width modulation reducing the illuminance on the ground 200 to 100 lx. As already stated above, the helicopter search light is operated in the spot light mode at full strength for heights above about 50 m.

For an ambient illuminance of 5 lx, the helicopter search light may still emit the light output according to the dotted curve 82. In particular, a value of 100 lx on the ground may be predetermined minimum value for the illumination by the helicopter search light. In this case, although the ratio r would be 20, the helicopter search light would still provide for an illuminance of 100 lx for as many heights as possible. In other words, the predetermined minimum value for the illuminance takes precedence over the ratio between the second light detection value and the first light detection value for such a low ambient illuminance.

The solid curve 84 illustrates a similar situation, which differs from the previously described situation (dotted curve 82) in that the ambient illuminance is 30 lx. In consequence, the maximum illuminance on the ground 200 is restricted to 300 lx (=10×30 lx) for heights H up to approximately 30 m above the ground 200. At larger heights H, i.e. at heights of more than 30 m, the capacity of the helicopter search light 1, even when it is operated at full strength, is not sufficient for resulting in an illuminance on the ground 200 of 300 lx or more. In consequence, the illuminance on the ground 200 decreases with further increasing height H. The dimmed flood light mode and the dimmed spot light mode are used in an analogous manner as described above with respect to the ambient illuminance of 10 lx. It is also possible that the desired illuminance is achieved via appropriate dimming of the light sources in the spot light mode for all heights.

The dashed-dotted curve 86 illustrates a situation in which the ambient illuminance is 1000 lx. In consequence, the maximum illuminance on the ground 200 is restricted to 10000 lx (=10×1000 lx). The capacity of the helicopter search light 1, however, is able to cause such an illuminance only for small heights H above the ground even in the spot light mode, in particular for heights H up to approximately 10 m. For larger heights H, i.e. for heights of more than 10 m, the capacity of the helicopter search light 1, even when it is operated at full strength in the spot light mode, is not sufficient for resulting in an illuminance on the ground 200 of 10000 lx or more. In consequence, the illuminance on the ground 200 decreases when the height H above the ground 200 exceeds 10 m. In this case, the spot light mode may be used at all heights, with suitable dimming taking place at heights of 10 m or less.

In all lighting situations illustrated in FIG. 8, the contrast ratio r between the area which is illuminated by helicopter search light 1 and the non-illuminated areas of the ground 200 does not exceed 10. As a result, a deterioration of the pilot's visual perception due to an excessive contrast ratio r can be reliably avoided.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A helicopter search light comprising:
   a lighting arrangement comprising at least one light source and having an adjustable light output;

a light detector, which is configured for detecting light reflected by the ground and/or at least one item on the ground and for providing a detection signal which is correlated to an amount of light detected; and a control unit, coupled to the light detector for receiving the detection signal and to the at least one light source for controlling the adjustable light output of the lighting arrangement;

wherein the control unit is configured for:
- (A) selectively switching at least a subset of the at least one light source on and off;
- (B) determining a first light detection value ($w_1$) from the detection signal, the first light detection value ($w_1$) being indicative of the amount of light detected while the at least one subset of the at least one light source is switched off;
- (C) determining a second light detection value ($w_2$) from the detection signal, the second light detection value ($w_2$) being indicative of the amount of light detected while the at least one subset of the at least one light source is switched on; and
- (D) controlling the adjustable light output of the lighting arrangement as a function of the first light detection value ($w_1$) and the second light detection value ($w_2$).

2. The helicopter search light according to claim 1, wherein the control unit is configured for repeatedly adjusting the adjustable light output of the lighting arrangement on the basis of repeatedly, in particular periodically, switching the at least one subset of the at least one light source on and off and repeatedly determining the first and second light detection values ($w_1$, $w_2$).

3. The helicopter search light according to claim 1, wherein the function of the first light detection value ($w_1$) and the second light detection value ($w_2$) is a ratio ($r$) between the second light detection value ($w_2$) and the first light detection value ($w_1$) and wherein the control unit is configured for controlling the adjustable light output of the lighting arrangement so that the ratio ($r$) between the second light detection value ($w_2$) and the first light detection value ($w_1$) approaches a ratio target value ($r_T$).

4. The helicopter search light according to claim 3, wherein the target ration value ($r_T$) is between 5 and 50, particularly between 5 and 15, more particularly about 10.

5. The helicopter search light according to claim 1, wherein the control unit is configured for controlling the adjustable light output of the lighting arrangement so that the second light detection value ($w_2$) exceeds a predetermined minimum value.

6. The helicopter search light according to claim 5, wherein the first and second light detection values ($w_1$, $w_2$) are illuminance values and wherein the predetermined minimum value is between 50 lx and 500 lx, in particular between 50 lx and 150 lx, more in particular about 100 lx.

7. The helicopter search light according claim 1, wherein controlling the adjustable light output of the lighting arrangement includes switching the at least one subset of the at least one light source periodically on and off employing a pulse width modulation and adjusting a duty factor of the pulse width modulation for adjusting the adjustable light output of the lighting arrangement.

8. The helicopter search light according to claim 1, wherein the lighting arrangement has a flood light mode and a spot light mode and wherein the lighting arrangement is switchable between the flood light mode and the spot light mode, wherein the control unit in particular is configured for switching the lighting arrangement between the flood light mode and the spot light mode depending on the first light detection value ($w_1$) and the second light detection value ($w_2$).

9. The helicopter search light according to claim 1, wherein the light detector is a luminance detector and/or wherein a detection angle ($\alpha$) of the light detector is significantly smaller, in particular at least 10 times smaller, than a light emission angle ($\beta$) of the lighting arrangement, wherein the detection angle ($\alpha$) of the light detector in particular is smaller or equal to 3°, wherein the light detector in particular comprises a collimating lens and/or a parabolic reflector, with the collimating lens and/or the parabolic reflector restricting the detection angle of the at least one light detector.

10. A method of adjusting a light output of a helicopter search light, with the helicopter search light having a lighting arrangement, comprising at least one light source and having an adjustable light output, wherein the method includes the steps of:
- (a) switching at least a subset of the at least one light source off;
- (b) detecting ambient light reflected by the ground and/or at least one item on the ground and providing a first light detection value, the first light detection value ($w_1$) being indicative of the amount of light detected;
- (c) switching the at least one light source on;
- (d) detecting light reflected by the ground and/or at least one item on the ground and providing a second light detection value ($w_2$), the second light detection value ($w_2$) being indicative of the amount of light detected; and
- (e) controlling the adjustable light output of the lighting arrangement as a function of the first and second light detection values ($w_1$, $w_2$).

11. The method of adjusting a light output of a helicopter search light according to claim 10, wherein the method includes repeatedly adjusting the adjustable light output of the lighting arrangement by repeatedly, in particular periodically, switching at least a subset of the at least one light source on and off and repeatedly determining the first and second light detection values ($w_1$, $w_2$).

12. The method of adjusting a light output of a helicopter search light according to claim 11, wherein the function of the first light detection value ($w_1$) and the second light detection ($w_2$) value is a ratio ($r$) between the second light detection value ($w_2$) and the first light detection value ($w_1$) and wherein the method includes controlling the adjustable light output of the lighting arrangement so that the ratio between the second light detection value ($w_2$) and the first light detection value ($w_1$) approaches a ratio target value ($r_T$).

13. The method of adjusting a light output of a helicopter search light according to claim 10 wherein the method includes controlling the adjustable light output of the lighting arrangement so that the second light detection value ($w_2$) exceeds a predetermined minimum value.

14. The method of adjusting a light output of a helicopter search light according to claim 13, wherein the first and second light detection values ($w_1$, $w_2$) are illuminance values and wherein the predetermined minimum value is between 50 lx and 500 lx.

15. The method of adjusting a light output of a helicopter search light according to claim 13, wherein the first and second light detection values ($w_1$, $w_2$) are illuminance values and wherein the predetermined minimum value is between 50 lx and 150 lx.

16. The method of adjusting a light output of a helicopter search light according to claim 13, wherein the first and second light detection values ($w_1$, $w_2$) are illuminance values and wherein the predetermined minimum value is about 100 lx.

17. The method of adjusting a light output of a helicopter search light according to of claims 10, wherein the method includes switching at least a subset of the at least one light source periodically on and off employing a pulse width modulation and adjusting a duty factor of the pulse width modulation for adjusting the adjustable light output of the lighting arrangement.

\* \* \* \* \*